United States Patent [19]

Couse et al.

[11] Patent Number: 4,864,437
[45] Date of Patent: Sep. 5, 1989

[54] HEAD LOADING VELOCITY CONTROL

[75] Inventors: Robert F. Couse, Saratoga; Patrick G. Mercer, Santa Clara, both of Calif.

[73] Assignee: Syquest Technology, Fremont, Calif.

[21] Appl. No.: 164,882

[22] Filed: Mar. 7, 1988

[51] Int. Cl.<sup>4</sup> .......................... G11B 21/02; G11B 5/54
[52] U.S. Cl. ..................................... 360/75; 360/105; 360/78.06; 369/233
[58] Field of Search ....................... 360/75, 78.07, 105, 360/104, 77.05, 77.08, 77.02, 78.04, 78.06, 78.11, 78.12, 103, 77.03; 369/215–217, 32, 33, 41, 233

[56] References Cited

U.S. PATENT DOCUMENTS

| | | | |
|---|---|---|---|
| Re. 32,075 | 1/1986 | Harrison et al. | 360/77.08 |
| 3,648,263 | 3/1972 | Kunstadt | 360/75 |
| 4,202,020 | 5/1980 | Lovgren et al. | 360/75 |
| 4,241,366 | 12/1980 | Nishida et al. | 360/105 |
| 4,355,273 | 10/1982 | DuVall | 360/78.07 |
| 4,375,070 | 2/1983 | Isozaki et al. | 360/75 |
| 4,488,187 | 12/1984 | Alaimo | 360/77.08 |
| 4,630,190 | 12/1986 | Alaimo et al. | 360/77.05 |
| 4,755,892 | 7/1988 | Carteau et al. | 360/75 |

Primary Examiner—Alan Faber
Assistant Examiner—Steven R. Garland
Attorney, Agent, or Firm—Fliesler, Dubb, Meyer & Lovejoy

[57] ABSTRACT

A disc drive 22 having a head 28 actuated by an actuator 27 includes a head loading velocity control for successfully and accurately loading the head 28 onto a disc 26 so as not to cause damage to the head 28 or the disc 26.

14 Claims, 1 Drawing Sheet

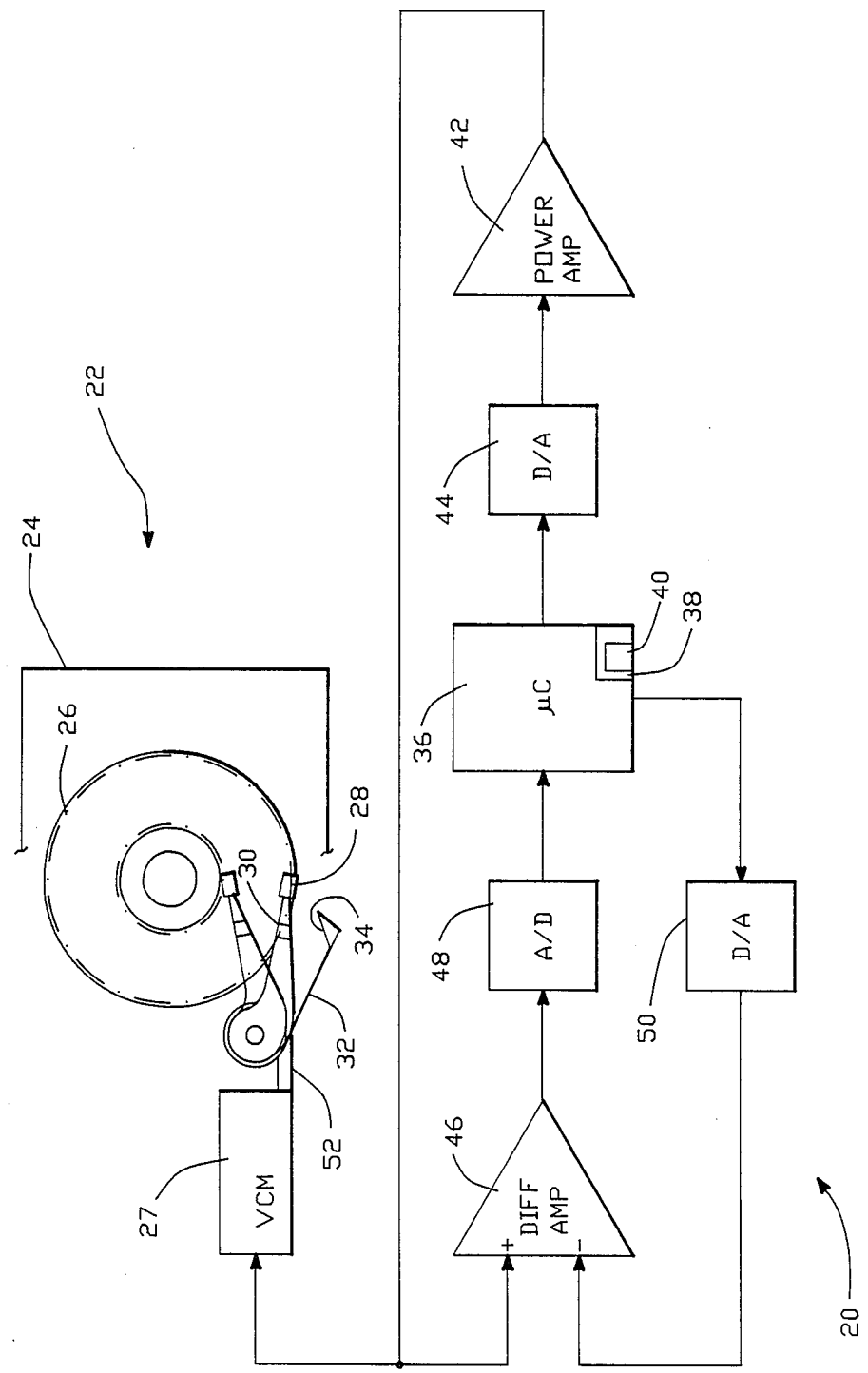

HEAD LOADING VELOCITY CONTROL

FIELD OF THE INVENTION

The present invention is directed to a disc drive having read/write heads for accessing information stored on a disc and in particular to a mechanism for loading the read/write heads onto the disc.

BACKGROUND ART

In disc drives, and in particular in disc drives which can accept a cartridge containing a disc which can be used to store information, there is a requirement that read/write heads be loaded onto the disc so that the data transfer process can begin. This loading operation needs to be accomplished in an accurate and smooth manner so that neither the heads nor the disc is damaged as the head loading proceeds.

Generally in prior art devices, head loading has been accomplished through mechanical devices using springs, levers, dash pots and the like in order to allow the heads to be successfully loaded onto the disc without damage to either the heads or the disc.

However, with such mechanical devices, there is no mechanism provided for determining the velocity of the loading process or for altering that velocity so that it is optimal. This is in contrast to the ability of disc drives with servo systems to determine the velocity and position of the head once the head has actually been loaded onto the disc, so that the heads can read the servo information.

With some prior art devices using, for example, glass scales, it is possible to know the position and velocity of a head even though the head is not loaded onto the disc, as the glass scale is generally associated with the head actuator and not the disc. Thus as the actuator urges the head from an unloaded to a loaded position, the glass scale can determine both the velocity and position of the head.

SUMMARY OF THE INVENTION

The present invention is directed toward enhancing the state of the prior art.

The present invention includes a head loading velocity control for a disc drive wherein the disc drive includes a read/write head mounted on an arm, an actuator for causing the head to move relative to the disc and a mechanism for loading the head onto the disc. The head loading velocity control includes a mechanism for determining and controlling the velocity with which a head is loaded onto the disc.

The head loading velocity control further includes a microprocessor with memory for storing a reference table of voltage values and provides for driving the actuator. The control further provides for measuring the voltage across the actuator as the actuator is driven by the microprocessor. Further the velocity control provides for comparing the voltage values in the reference table with the measured voltage across the actuator and for communicating the comparison to the microprocessor so that the velocity control can determine and selectively change the velocity of the head as the head is loaded onto the disc.

In an aspect of the invention, with the arm locked in a position so that the head is not loaded onto the disc, the microprocessor can provide a selected range of driving currents to the actuator and the voltage across the actuator can be determined. This information can be stored in the reference table.

In another aspect of the invention, with the microprocessor driving the actuator and with the arm unlocked so that the head can be loaded onto the disc, the voltage across the actuator can be determined. This voltage comprises a component which is produced by the actuator driving current as provided under the control of the microprocessor and a component which includes the back EMF voltage generated by the actuator itself. The control can then take the difference of the voltage across the actuator and the voltage values stored in the reference table, for the specified driving current, in order to accurately measure the back EMF and thus determine the velocity of the head as the actuator loads the head onto the disc.

It is an object of the present invention to provide a head loading velocity control for determining and controlling the velocity of a head as it is loaded onto a disc.

It is a further object of the present invention to determine the back EMF generated by the actuator and use this value to determine the velocity of the head as it is being loaded onto the disc.

BRIEF DESCRIPTION OF THE DRAWING

FIG. 1 is a schematic of the head loading velocity control of an embodiment of the invention.

DETAILED DESCRIPTION OF THE PREFERRED EMBODIMENT

With reference to FIG. 1 the head loading velocity control of the invention is depicted and designated by the numeral 20. Control 20 is used in a disc drive 22 and in a preferred embodiment in a disc drive which can accept a removable cartridge 24. Embodiments of such drives and cartridges can be found in two pending U.S. patent applications entitled "Removable Cartridge Disc Drive With Radial Arm Voice Coil Actuator" and "Removable Cartridge For Radial Arm Voice Coil Actuated Disc Drive", which were filed on Feb. 26, 1988 in the inventors' names of Thompson et al. and which are owned by the present Assignee SyQuest Technology, which applications are incorporated herein by reference.

Cartridge 24 contains therein a disc 26 which can store information in one of a number of modes, including a magnetic storage mode, an optical storage mode and others. The disc drive 22 includes an actuator 27 which in a preferred embodiment is a voice coil motor. Further in a preferred embodiment a head 28 is secured to the actuator 27 by an arm 30 so that the actuator 27 can cause the head 28 to move by moving the arm 30. The arm 30 rests on a load arm 32 which has a ramp 34. The actuator 27 can cause the head 28 to move off of the load arm 32 onto the disc 26 by sliding down the ramp 34.

The head loading velocity control 20 includes a microprocessor or microcomputer 36 which has a memory or store 38 for storing an appropriate reference table 40. The microprocessor 36 drives a power amplifier 42 through a digital to analog converter 44 in order to provide a range of currents to the actuator 27. Accordingly microprocessor 36 can selectively drive the actuator 27 causing the head 28 to load on the disc 26 at a speed which has a direct relationship to the current supplied to the actuator 27 by the power amplifier 42.

A voltage signal from the actuator 27 is comprised of a first voltage component directly related to the current provided to the actuator 27 by the power amplifier 42. The voltage signal includes a second component which is the back EMF generated by the actuator 27. Both components are provided to a differential amplifier 46.

The differential amplifier 46 communicates through an analog to digital converter 48 with the microprocessor 36. From table 40 the microprocessor 36 provides reference values, dependent on the current supplied by the power amplifier 42 to the actuator 27, to an offset digital to analog converter 50. The offset digital to analog converter 50 then provides an offset voltage signal to the differential amplifier 46 in order to cancel out the first proportion of the voltage signal from the actuator 27 which has a direct relationship to the current provided to the actuator 27 by the power amplifer 42. The remaining voltage signal is the back EMF generated by the movement of the actuator 27, as the head 28 is loaded onto disc 26. This back EMF voltage is provided through the analog to digital converter 48 to the microprocessor 36 which can then determine the velocity of the loading of the head 28 onto the disc 26. If the velocity is too great or too slow, the driving current from the power amplifier 42 can be modified by the microprocessor 36 to insure that the head is accurately and successfully loaded onto the disc with no damage to the head or the disc.

An actuator lock 52 is provided for holding the actuator 27 and thus head 28 in an unloaded position to enable the control 20 to generate table 40. Lock 52 can be either a mechanical or an electrical mechanism. A mechanical lock is disclosed in the above referenced Syquest patent application entitled "Removable Cartridge Disc Drive With Radial Arm Voice Coil Actuator".

INDUSTRIAL APPLICABILITY

The operation of the head loading velocity control 20 is as follows.

First a calibration step is performed. With the arm 30 upon which the head 28 is mounted locked in a position, by lock 52 which is incorporated into the actuator 27, so that head 28 is not loaded onto the disc, a range of current can be provided to the actuator 27 as directed by the microprocessor 36 through the power amplifier 42. The output of the actuator 27 does not include a back EMF component as none can be generated with the head 26 locked in an unloaded position. The range of voltages from the actuator 27 are provided through the differential amplifier 46 and the A/D converter 48 to the microprocessor 36 and are stored in table 40 of memory 38. It is to be understood that this calibration step is performed each time a cartridge 28 is inserted into the drive 22 prior to the loading of the head 28 onto the disc 26 in the cartridge 24. This is to allow the drive 22 to recalibrate and thus account for temperature variations due to the length of use of the drive 22.

Once the reference table 40 is made, the actuator 27 can be unlocked and the microprocessor 36 can proceed to direct a driving current to the actuator 27 in order to load the head 28 onto the disc 26. As this occurs, the voltage across the actuator 27 includes a component due to the current driving the actuator 27 as applied by the power amplifier 42 and also a component due to the back EMF voltage as generated by the actuator 27 itself. This signal is provided to the differential amplifier 46 where it is summed with an offset signal provided from the reference table 40 through the offset D/A converter to the differential amplifier 46. This offset signal is related to the current provided through the power amplifier 42 to the actuator 27. The differential amplifier 46 then provides a signal to the A/D converter 48 which is the difference of the signal from the actuator 27 and the offset signal from the offset D/A converter 50. This resultant signal is the back EMF voltage generated by the actuator 27. As the back EMF voltage is directly related to the velocity of the actuator 27, the velocity can then be determined by the microcomputer 36 and if the velocity is too great, the current driving the actuator 27 can be reduced by the microprocessor 36 and/or the polarity of the current can be changed. Likewise, if the actuator 27 is being driven too slowly, increased current will cause the actuator 27 to drive the head 28 onto the disc 26 in a more rapid manner. It is to be understood that the back EMF voltage is on the order of 1/100 the size of the voltage across the actuator 27 as caused by the current applied thereto by the power amplifier 42.

Accordingly, with the present invention, the velocity of the loading of the head 28 onto the disc 26 can be controlled in order to prevent damage to the disc 26 and the head 28.

Other aspects and advantages of the invention can be ascertained from a review of the claims and the figure.

It is to be understood that while the invention was disclosed with herein with respect to one specific embodiment, that other embodiments can come within the scope and breadth of the invention as claimed.

We claim:

1. A head loading velocity control for a disc drive, which disc drive includes a disc positioned therein, a read/write head mounted on an arm, an actuator for causing the head and arm to move relative to the disc and a mechanism for loading the head onto the disc, the head loading velocity control comprising:
   a processor means for providing means for storing a reference table of voltage values and including means for driving the actuator;
   means for measuring a voltage across the actuator as the actuator is driven by the driving means;
   means for comparing the voltage values in the reference table with the measured voltage across the actuator and for communicating the comparison to the processor means so that the processor means can determine and selectively change the velocity of the head by selectively driving the actuator.

2. The head loading velocity control of claim 1 including means for locking the head in an unloaded position; and
   said processor means having means for creating the reference table by driving the actuator with the head locked in an unloaded position by the means for locking the head and the measuring means measuring the resultant voltage across the actuator.

3. The head loading velocity control of claim 1 including:
   a digital to analog converter;
   an amplifier;
   said digital to analog converter communicating with said processor means;
   said amplifier communicating with said digital to analog converter and with the actuator;
   said driving means causing a signal to be sent from the processor means through the digital to analog converter to the amplifier, so that the amplifier can send a driving current signal to the actuator.

4. The head loading velocity control of claim 1 wherein said comparing means includes:

a differential amplifier means for receiving a voltage signal from the actuator;

an analog to digital converter for providing communication between said differential amplifier and said processor means;

a digital to analog converter for providing communication between said processor means with said reference tables and said differential amplifier so that the voltage values from the reference table can be subtracted from the voltage from the actuator in order to determine head loading velocity.

5. A disc drive with a disc positioned therein, a read/write head mounted on an arm, an actuator for causing the arm and head to move relative to the disc, a mechanism for loading the head onto the disc, and means for locking the head in an unloaded position, comprising:

head loading velocity control means for determining and controlling the velocity with which the head is loaded onto the disc;

said velocity control means including a processor means for driving the actuator;

said processor means including table means for storing reference values in a reference table;

said velocity control means including means for comparing a signal from the actuator and the reference values so that the velocity of the head can be determined and said processor means creating the reference table by driving the actuator with the head locked in an unloaded position by the means for locking the head and the comparing means receiving the signal from the actuator.

6. The disc drive of claim 5, wherein said velocity control means includes:

a digital to analog converter;

an amplifier;

said digital to analog converter communicating with said processor means;

said amplifier communicating with said digital to analog converter and with the actuator;

said processor means sending a signal through the digital to analog converter to the amplifier, so that the amplifier can send a driving signal to the actuator.

7. The disc drive of claim 5 wherein said comparing means includes:

a differential amplifier means for receiving a signal from the actuator;

an analog to digital converter for providing communication between said differential amplifier and said processor means;

a digital to analog converter for providing communication between said processor means with said reference tables and said differential amplifier so that the reference values from the reference table can be subtracted from the signal from the actuator in order to determine head loading velocity.

8. A method of controlling head loading velocity for loading of a head onto a disc in a disc drive comprising the steps of:

building a reference table prior to the loading of a head onto a disc;

wherein said building step includes:

a. locking the head in an unloaded position;

b. providing a range of driving signals across an actuator for the head;

c. measuring voltages across the actuator caused by the range of driving signals;

d. storing the range of measured voltages in the reference table as reference values;

driving the actuator to load the head onto the disc;

measuring a voltage across the actuator as the head is loaded onto a disc; and comparing the measured voltage with reference values stored in the reference table in order to determine the loading velocity.

9. The method of claim 8 including the step of:

adjusting the loading velocity depending on a result from the comparing step.

10. The method of claim 8 wherein said comparison step includes the step of comparing results of both measuring steps for the same driving signal used to drive the actuator.

11. The method of claim 8 including the step of:

building the reference table each time the head is loaded onto the disc.

12. A head loading velocity control for use in a disc drive with a disc position therein, a read/write head mounted on an arm, an actuator for causing the arm and head to move relative to the disc, a mechanism for loading the head onto the disc and means for locking the head in an unloaded position, and the head loading velocity control comprising:

processor means for driving the actuator;

table means for storing reference values in a reference table;

means for comparing a signal from the actuator and the reference values so that the velocity of the head can be determined as the head is being loaded onto the disc and said processor means creating the reference table by driving the actuator with the head locked in an unloaded position with the comparing means receiving the signal from the actuator.

13. The head loading velocity control of claim 12 including:

a digital to analog converter;

an amplifier;

said digital to analog converter communicating with said processor means;

said amplifier communicating with said digital to analog converter and with the actuator;

said processor means sending signal through the digital to analog converter to the amplifier, so that the amplifier can send a driving signal to the actuator.

14. The head loading velocity control of claim 12 wherein said comparing means includes:

a differential amplifier means for receiving a signal from the actuator;

an analog to digital converter for providing communication between said differential amplifier and said processor means;

a digital to analog converter for providing communication between said processor means, with said reference table, and said differential amplifier so that the reference values from the reference table can be subtracted from the signal from the actuator in order to determine head loading velocity.

* * * * *